United States Patent
Dearth et al.

(10) Patent No.: US 11,233,730 B2
(45) Date of Patent: Jan. 25, 2022

(54) NETWORK ROUTING USING AGGREGATED LINKS

(71) Applicant: Nvidia Corporation, Santa Clara, CA (US)

(72) Inventors: Glenn Dearth, Santa Clara, CA (US); Mark Hummel, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 182 days.

(21) Appl. No.: 16/700,611

(22) Filed: Dec. 2, 2019

(65) Prior Publication Data

US 2021/0014156 A1  Jan. 14, 2021

Related U.S. Application Data

(60) Provisional application No. 62/872,023, filed on Jul. 9, 2019.

(51) Int. Cl.
*H04L 12/709* (2013.01)
*H04L 12/707* (2013.01)
*H04L 12/751* (2013.01)
*H04L 12/721* (2013.01)

(52) U.S. Cl.
CPC ............ *H04L 45/245* (2013.01); *H04L 45/02* (2013.01); *H04L 45/22* (2013.01); *H04L 45/26* (2013.01)

(58) Field of Classification Search
CPC ....... H04L 45/02; H04L 45/22; H04L 45/245; H04L 45/26
See application file for complete search history.

(56) References Cited

U.S. PATENT DOCUMENTS

| | | | |
|---|---|---|---|
| 2007/0189284 A1* | 8/2007 | Kecskemeti | H04L 45/02 370/389 |
| 2011/0164508 A1* | 7/2011 | Arai | H04L 45/60 370/245 |
| 2016/0065407 A1* | 3/2016 | Saltsidis | H04L 41/0806 370/255 |
| 2016/0234091 A1* | 8/2016 | Emmadi | H04L 41/0893 |
| 2017/0126549 A1* | 5/2017 | Paramasivam | H04L 49/9005 |
| 2018/0220196 A1* | 8/2018 | Slater | H04N 21/64776 |
| 2019/0045562 A1* | 2/2019 | Liu | H04W 76/22 |
| 2020/0067825 A1* | 2/2020 | Huang | H04L 45/245 |

* cited by examiner

*Primary Examiner* — Gary Mui

(57) ABSTRACT

Introduced herein is a routing technique that, for example, routes a transaction to a destination port over a network that supports link aggregation and multi-port connection. In one embodiment, two tables that can be searched based on the target and supplemental routing IDs of the transaction are utilized to route the transaction to the proper port of the destination endpoint. In an embodiment, the first table provides a list of available ports at each hop/route point that can route the transaction to the destination endpoint, and the second table provides a supplemental routing ID that can select a specific group of ports from the first table that can correctly route the transaction to the proper port.

24 Claims, 3 Drawing Sheets

NETWORK ROUTING USING AGGREGATED LINKS

CROSS-REFERENCE TO RELATED APPLICATION

This application claims the benefit of U.S. Provisional Application Ser. No. 62/872,023, filed on Jul. 9, 2019, entitled "NETWORK ROUTING USING AGGREGATED LINKS," commonly assigned with this application and incorporated herein by reference in its entirety.

TECHNICAL FIELD

This application is directed, in general, to network routing protocols and, more specifically, to a method and apparatus for routing transactions in a network that support aggregated links and/or multi-port connections.

BACKGROUND

Network routing protocols often use a system memory address of a destination endpoint as a target identifier (ID) of a transaction when routing. While the target ID alone may be sufficient for a destination endpoint that is connected to a network using a single port, it may be insufficient for endpoints that are connected using multiple ports since the target ID does not indicate the port to which the destination endpoint is attached. Moreover, when a network employs aggregated links, it can introduce divergent paths at various hops/route points that can constrain the transaction to a path that routes the transaction to the wrong port of the destination endpoint.

SUMMARY

One aspect provides a method of routing transactions over a network. The method includes: receiving a transaction that is headed to a particular port of a destination endpoint over the network; selecting a particular group of ports that constrains the transaction to a specific path that routes the transaction to the particular port of the destination endpoint; and routing the transaction to the particular port of the destination endpoint via the specific path.

Another aspect provides a switching device for routing transactions over a network. The switching device includes a pipeline configured to: receive a transaction that is headed to a particular port of a destination endpoint over the network; select a particular group of ports that constrains the transaction to a specific path that routes the transaction to the particular port of the destination endpoint; and route the transaction of the request to the destination endpoint via the specific path.

BRIEF DESCRIPTION

Reference is now made to the following descriptions taken in conjunction with the accompanying drawings, in which.

DETAILED DESCRIPTION

Introduced herein is a routing technique that routes a transaction to a destination port using a target ID and an additional supplemental routing ID. Utilizing two tables that can be indexed and sorted based on the target and supplemental routing IDs, the introduced technique can identify ports and their connected paths and select a group of the ports that constrain the transaction to a specific path that routes the transaction to the proper port of the destination endpoint. The first table indicates a list of available ports at each hop/route point that can route the transaction to the destination endpoint, and the second table provides routing information that can be used to select a specific group of ports from the first table to route the transaction to the proper port of the destination endpoint.

Some of the benefits of the introduced routing technique include its flexibility to support a large variety of fabric topologies that utilizes link aggregations and multi-port connections, and its efficiency in keeping the routing table size to a minimum and simplifying programming. These benefits are achieved by utilizing two routing tables that have flexible formats and support efficient partition and selection of the entries in the tables.

Figure 1:
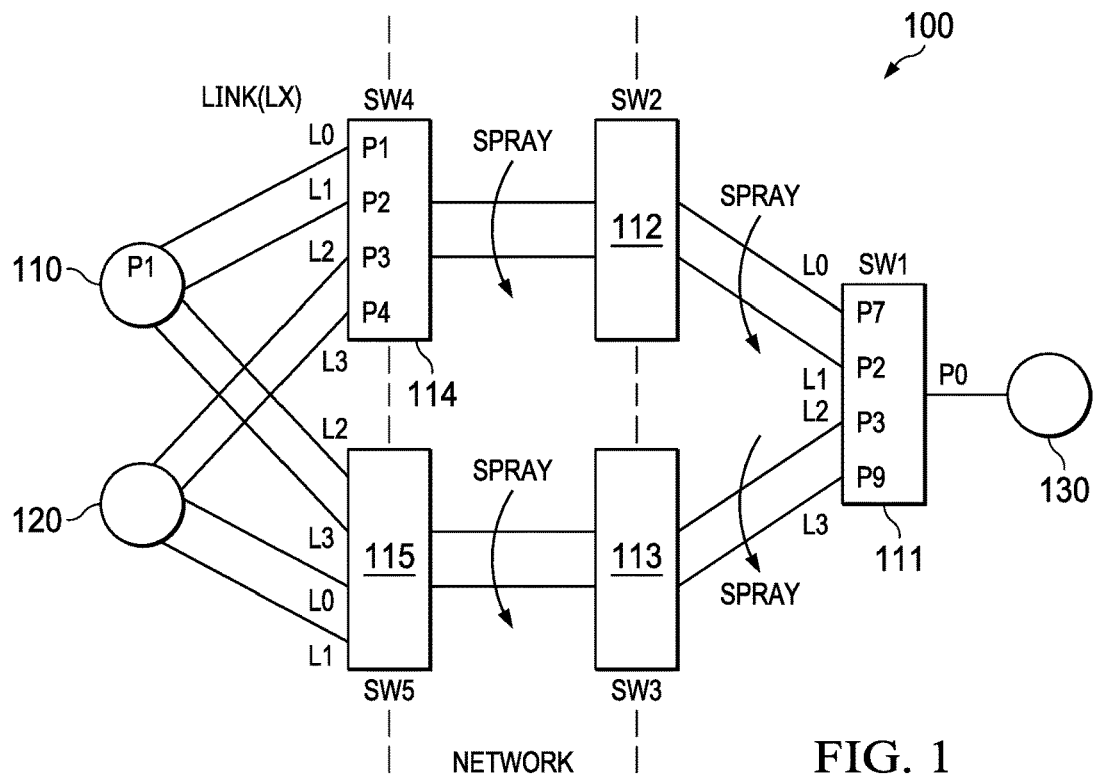
FIG. 1 is an illustration of an embodiment of a network through which transactions between connected endpoints are exchanged.

FIG. 1 illustrates an embodiment of a network 100 in which transactions can be routed using the introduced technique. In the illustrated embodiment, the network 100 is an interconnect fabric that uses a networking protocol such as NVLink™ provided by NIVIDA® Corporation of Santa Clara, Calif., that supports multi-port connection and link aggregation.

In the illustrated embodiment, the network 100 is connected to three endpoints, two source endpoints 110 and 120 and a target endpoint 130, that transmit and receive transactions through the network 100. While the source and target endpoints 110, 120, 130 are labeled respectively for their roles in the illustrated embodiment, their functions are not limited to their roles. As such, the source endpoints 110, 120 can not only make a request but also respond to a request when targeted, and the target endpoint 130 can make a request in addition to a response to a received request. The endpoints 110-130 can be processing units such as graphics processing units (GPUs) and central processing units (CPUs), storage units such as memories, and/or networking units such as network interface cards.

In the illustrated embodiment, the endpoints 110-130 are connected to the network 100 and to each other using switches 111 (SW1), 112 (SW2), 113 (SW3), 114 (SW4), and 115 (SW5). Multiple ports of the source endpoints 110, 120 are connected to corresponding ports of the fourth (SW4) and fifth (SW5) switches 114, 115, and multiple ports of the switches 111-115 are connected to one another. The multi-port connections between the switches 111-115 allow aggregations of parallel connections/links, i.e., links between the same pair of switches. The link aggregation may increase throughput beyond what a single connection could sustain and provide redundancy in case one of the links should fail. The switches 111-115 may be a switching device that supports multi-port connection and link aggregation such as NVSwitch™ of NVIDIA®. The switches 111-115 may also be used to support statistical multipathing to minimize hot-spotting effects from converging multiple traffic streams.

Figure 2:
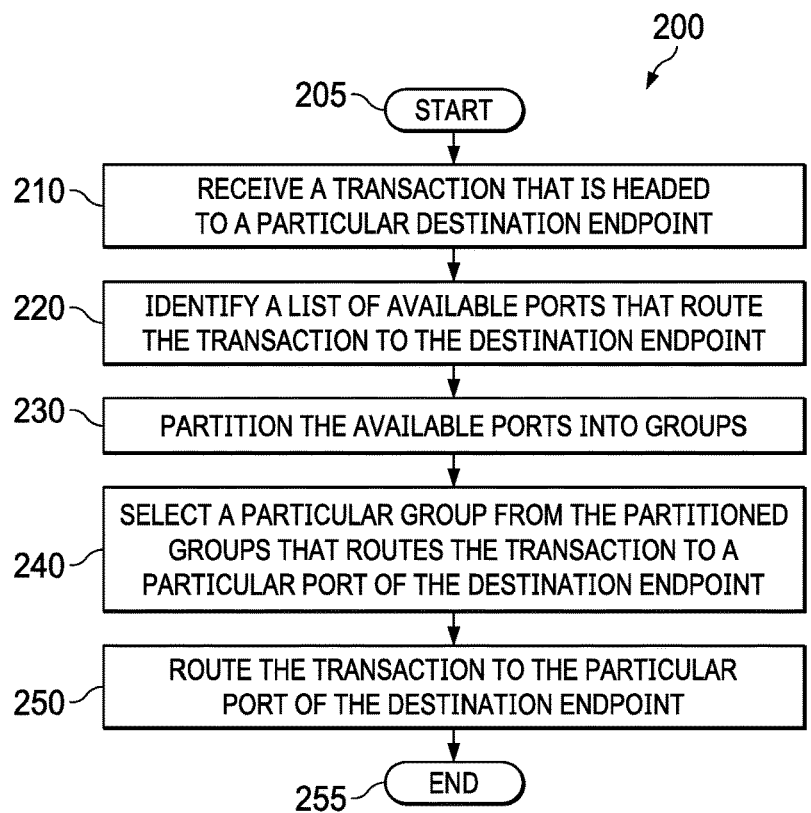
FIG. 2 is an illustration of a flow diagram of an embodiment of a method for routing transactions over a network carried out according to the principles of the disclosure.

FIG. 2 illustrates a flow diagram of an embodiment of a method 200 for routing transactions over a network, such as network 100 in FIG. 1, that supports multi-port connection and link aggregation. The method 200 may be performed by a switching device at each hop or routing point between source and destination endpoints, such as the switches 111-115 in FIG. 1. To illustrate the actual application of the introduced technique, the method 200 is described both generally and from the point of view (POV) of the first switch 111 in FIG. 1. In the illustrated embodiment of FIG. 1, the first switch 111 is routing a response of the request that was sent from the port P1 of the source endpoint 110. The method 200 starts at step 205.

At step 210, a transaction that is headed to a particular destination endpoint is received at a switching device that is performing the method 200. The transaction may be received from a switch at the previous hop/route point or from an endpoint that generated the transaction. The received transaction includes in its header a target ID, which indicates a destination of the transaction, e.g., an endpoint that the transaction is headed, and a supplemental routing ID, which indicates a source port of the transaction, e.g., an endpoint port through which the transaction was first injected into the network.

From the POV of the first switch 111 in FIG. 1, the received transaction is a response from the target endpoint 130 that is headed back to the destination port P1 of the source endpoint 110, from where the original request was sent. The response is received from the target endpoint 130 via port P0 of the first switch 111, which is the only port of the first switch 111 to which the target endpoint 130 is exposed. The received response includes in its header a target ID, which indicates the source endpoint 110 as the destination, and a supplemental routing ID, which indicates the port P1 of the source endpoint 110 as the source port of the request to which the received response is responding.

At step 220, a list of available ports in the switching device that route the transaction to the destination endpoint are identified. The available ports may be identified as positional bits of a vector, where each positional bit corresponds to each different port of a given endpoint, or as an array of integers, where each integer represents each different port numbers of a given endpoint. The available ports are searched and identified from a routing ID table using the target ID of the transaction as an index into the routing ID table. By projecting paths of ports in a switching device that received a given transaction, some of the ports of the switching device that route the given transaction to its destination endpoint are identified. In one embodiment, paths of switch ports are determined from the network configuration information that was gathered during the network initiation. The routing ID table is stored and accessed from a routing ID memory in the switching device.

For the first switch 111 in FIG. 1, a list of available ports in the first switch 111 that can route the response back to the source endpoint 110 is identified. The list includes ports P2, P3, P7 and P9, which are associated with Link1, Link2, Link0 and Link3, respectively. This port-link association may be indicated in the header of the response.

Figure 3A:
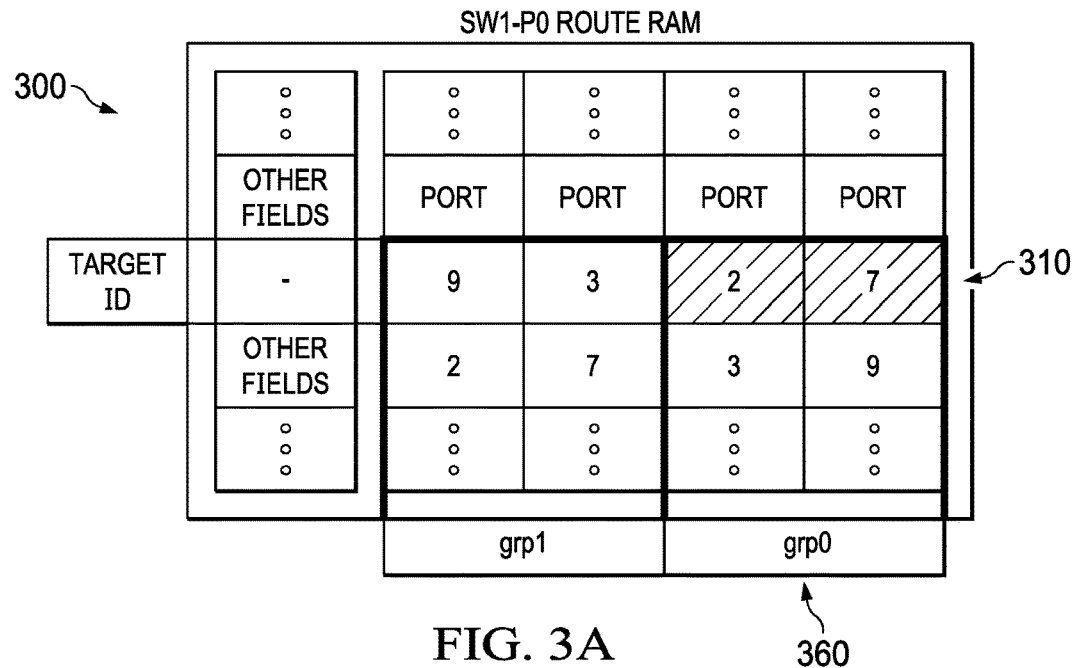
FIG. 3A is an illustration of an embodiment of a routing ID table that is programmed according to the principles of the disclosure.

FIG. 3A illustrates an embodiment of a routing ID table 300 that is stored and accessed from a routing ID memory in the first switch 111. Using the target ID of the response as an index, the available ports are identified as an array of integers, i.e. a row 310 of port numbers in the first switch 111. The row 310 of the table 300 lists the four ports P2, P3, P7 and P9 that route the response to the source endpoint 110. Unlike positional bits of a vector, which retains a rigid form, the port numbers can be programmed to be placed in contiguous fields as shown in FIG. 3A. This programmable ordering of field entries allows flexible groupings of various sizes for the field entries Returning to FIG. 2, at step 230, the ports identified in the step 220 are partitioned into groups. More specifically, the identified ports are partitioned into groups using a group select and a group size of a supplemental routing ID table. The group select and group size are selected from the supplemental routing ID table using the target ID and the supplemental routing ID of the transaction. The group select and group size are programmed into the supplemental routing ID table during fabric initialization, e.g., the topology discovery, based on the groups' connected paths. More specifically, the group select and group size are based on connected paths of ports in each group. Each partitioned group of ports corresponds to a group of aggregated links that are associated with the ports in each partitioned group and form an independent routing path, e.g., a diverging path, from other partitioned groups.

Figure 3B:
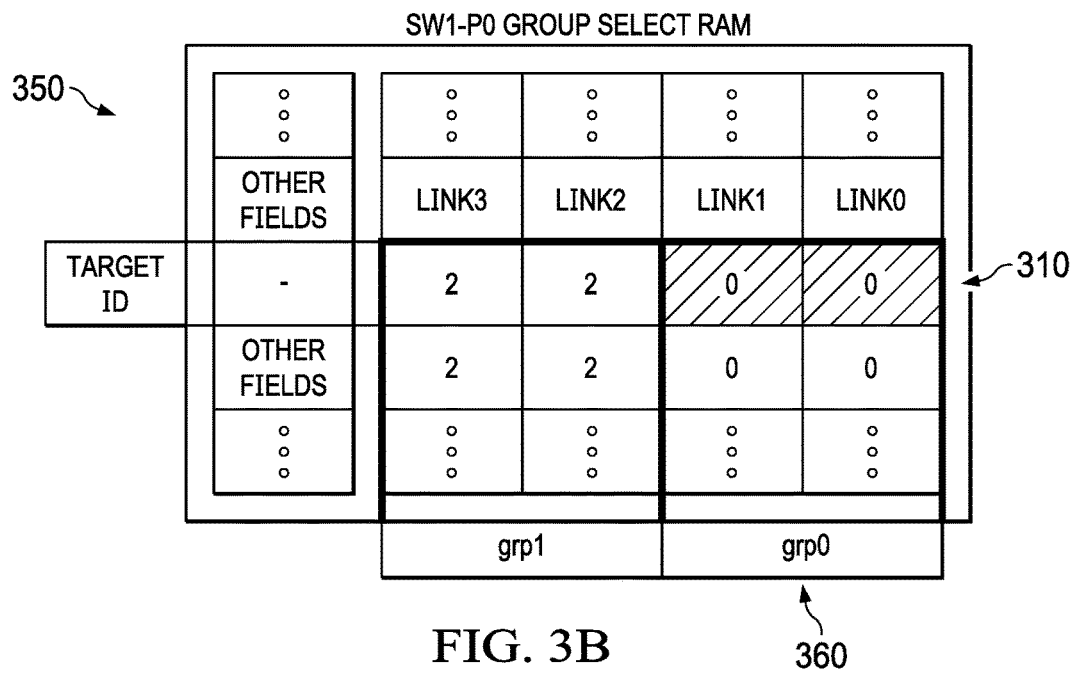
FIG. 3B is an illustration of an embodiment of a supplemental routing ID table that is programmed according to the principles of the disclosure.
Figure 4:
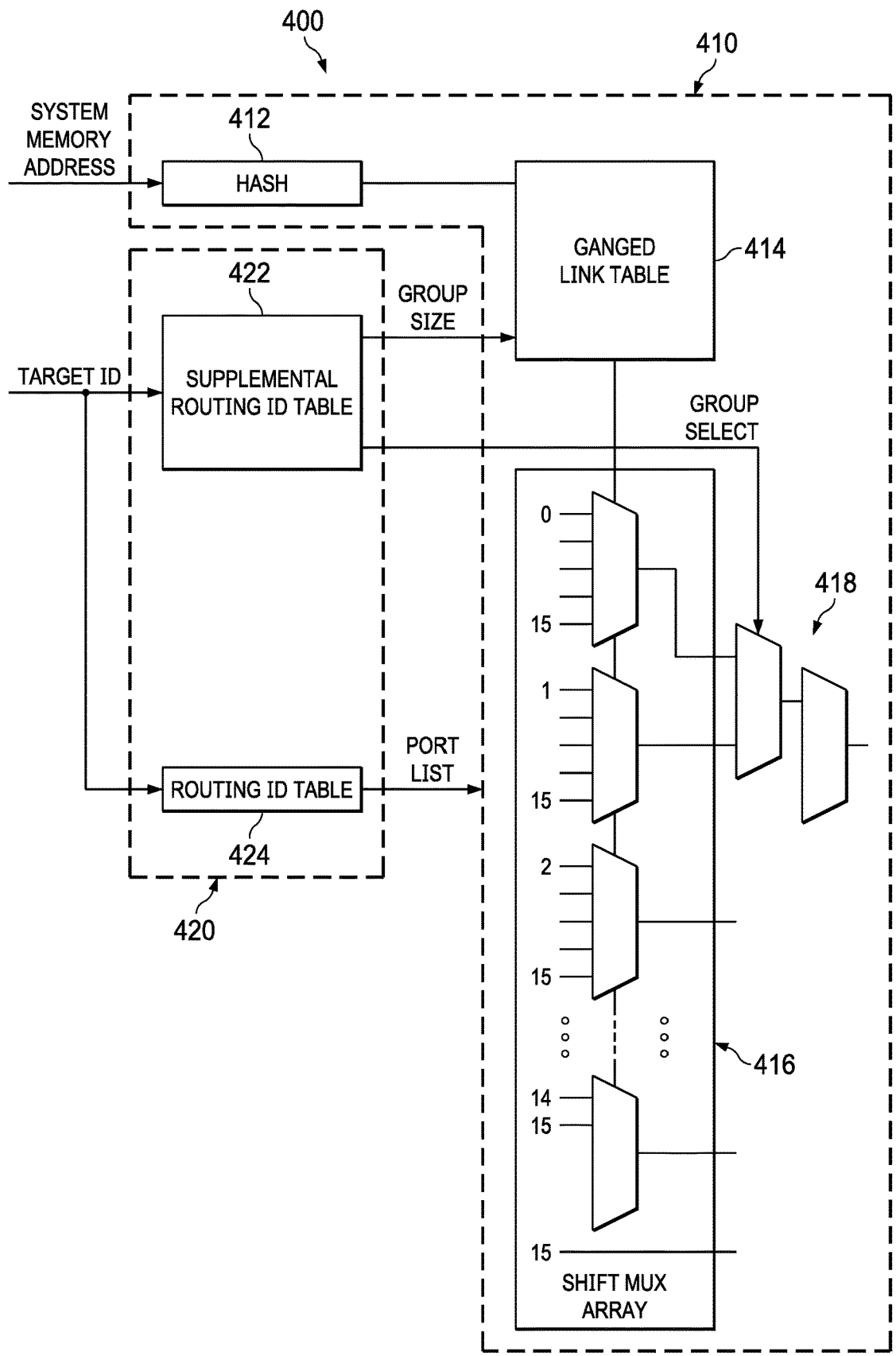
FIG. 4 is an illustration of a block diagram of an embodiment of a switching device for routing transactions over a network that is implemented according to the principles of the disclosure.

With respect to the first switch 111 in FIG. 1, its four available ports P2, P3, P7 and P9 are partitioned into two groups of two ports as shown in FIG. 3A. The first group (grp0) includes ports P7 and P2, and the second group (grp1) includes ports P3 and P9. As mentioned above, the partitioning is carried out based on a group select and a group size, which are selected from the supplemental routing ID table using the target ID and the supplemental routing ID of the transaction. In the illustrated embodiment, the ports that belong to a same group are placed next to each other for easier grouping and hardware implementation. Ports P7 and P2 are placed next to teach other for the first group, and ports P3 and P9 are placed next to each other for the second group. As discussed above, the flexibility of the integer format allows the flexible placements of the port number values. FIG. 3B illustrates an embodiment of a supplemental routing ID table 350 that is stored and accessed from a routing ID memory in the switch 111. The illustrated supplemental routing ID table 350 is indexed using the target ID of the transaction, and a group select and a group size are selected, using the supplemental routing ID of the transaction, for partitioning the four ports P2, P3, P7 and P9 of the first switch 111 into the two groups. In the illustrated supplemental routing ID table 350, the group select may be indicated from multiplexor designations of the links associated with the four ports P2, P3, P7 and P9. Ports associated with Link0 and Link1 are both associated with the multiplexor0 and thus in a same group (grp0) and ports associated with Link2 and Link3 are both associated with the multiplexor2 and thus in a same group (grp1). The group size may be indicated from a number of ports or links in each group. An example of multiplexors, multiplexor array 416, are illustrated in FIG. 4.

Returning to FIG. 2, at step 240, a particular group of ports that constrain the transaction to a specific path that route the transaction to the particular port of the destination endpoint is selected from the partitioned groups. Similar to the step 220, the groups are selected using the group select and the group size from the supplemental routing ID table.

For the first switch 111 of FIG. 1, the first group (grp0) is selected because the ports P2 and P7 can constrain the response to paths that go through the second 112 and fourth 114 switches and reach the port P1 of the source endpoint 110. The first group 360 is shown in FIGS. 3A and 3B. Had the second group (grp1) been selected, the transaction would go through the third 113 and fifth 115 switches and will not be able to reach the source endpoint 110 via the port P1, violating a requirement of a network routing protocol, such as NVLink™, which requires a response transaction to be routed to the source port, i.e. the port where the initial request transaction was injected.

At step 250, the transaction is routed toward the particular port of the destination endpoint using the ports in the selected group. Depending on the location of the switching device with respect to the particular endpoint and the links associated with ports in the selected group, the transaction can be sprayed over the aggregated link or transmitted using a particular port. It is understood that when spraying a transaction over multiple aggregated links, the transaction may be transmitted over one of the links chosen by combining a hashed value and the group size value derived from the supplemental routing ID in the supplemental routing ID table. For a request transaction, the hashed value may be generated from the system address of the source endpoint, which is present in the header, and for a response transaction, the hashed value may be generated using a pseudo random generator.

In the case of the first switch 111 in FIG. 1, the response is routed to the next hop, the second switch 112, using the ports P2 and P7 in the selected group grp0. As the ports P2 and P7 are associated with aggregate links Link1 and Link0, the response is sprayed over Link1 and Link0. To determine the link to transmit the response over, the hashed value from a pseudo random generator and the group size value of 2 derived from the supplemental routing ID table 350 are combined.

Once the transaction is routed to the particular port of the destination endpoint or forwarded to the next hop/route point toward the particular port, the method 200 ends at step 255. For the first switch 111 of FIG. 1, the method 200 ends once the response is sprayed over Link1 and Link0 and LAN1 to the next hop, the second switch 112.

It is understood that the method 200 is repeated at each hop/route point of the transaction until the transaction reaches the particular port of the destination endpoint. As such, to complete the routing of the response to the port P1 of the source endpoint 110 in FIG. 1, the method 200 would be repeated when the response reaches the second switch 112 and repeated again when it reaches the fourth switch 114.

Similar to the first switch 111, when the response arrive at the second switch 112, the method 200 will identify and partition ports of the second switch 112 that route the response to the port P1 of the source endpoint 110 into groups, select one of the groups that routes the response to port P1 of the source endpoint 110 and spray the response over the aggregated links associated with the ports in the selected group to the fourth switch 114.

Again, when the response arrives at the fourth switch 114, the method 200 will identify and partition ports of the fourth switch 114 that route the response to the port P1 of the source endpoint 110 into groups. While both of the identified ports, P1 and P2 can route the response to the source endpoint 110, only the port P1 of the fourth switch 114 can route the response to the port P1 of the source endpoint 110. As such, the method 200 here selects a group including port P1 and transmits the response over the port P1 to the source endpoint 110. As the group includes only one port, the response is not sprayed.

It should be understood that although the port P1 is a port of the fourth switch 114, P1 is considered as the destination port of the source endpoint 110, from which the request of the response was transmitted, because the port P1 is the only switch port that is directly connected to and thus can reach the port of the source endpoint 110.

FIG. 4 illustrates an embodiment of a switching device 400 for routing transactions over a network such as network 100 in FIG. 1. The switching device 400 may be one of the switching devices, such as the switches 111-115 in FIG. 1, that are connected to endpoints using multiple ports and employ aggregated links. In the illustrated embodiment, the switching device 400 includes a pipeline 410 and a memory 420. The memory 420 includes a supplemental routing ID table 422 and a routing ID table 424.

The pipeline 410 is configured to receive a transaction that is headed to a particular port of a destination endpoint, identify a list of available ports in the switching device that can route the transaction to the particular port and partition the available ports into groups based on a supplemental routing ID of the transaction. The pipeline 410 is also configured to select a particular group of ports that constrain the transaction to a specific path to the particular port of the destination endpoint, and route the transaction to the destination endpoint via the specific path. In the illustrated embodiment, the pipeline 410 is an ingress pipeline that can include a processing unit (not shown) such as a central processing unit (CPU) and/or a graphics processing unit (GPU) that is configured to direct at least some of the operations of the pipeline 410.

The illustrated pipeline 410 includes a hashing module 412, a ganged link table (GLT) 414, a multiplexor array 416, and an array control unit 418. The multiplexor array 416 is configured to physically partition the identified ports into the groups. The partitioned groups of the ports are assigned to multiplexors in the array 416 using a group select, e.g., link-multiplexor designations in FIG. 3B, and a group size from the supplemental routing ID table 422 and the identified list of available ports in the routing ID table 424.

The array control unit 418 is configured to physically select one of the partitioned groups by selecting one of the multiplexors in the array 416. Using the group select of the supplemental routing ID from the supplemental routing ID table 422, the array control unit 418 selects one of the multiplexors of the array 416 and hence one of the partitioned groups for routing the transaction.

The hashing module 412 and the GLT 414 are configured to select one of the ports in the particular group, i.e. one of the inputs of the multiplexor in the array 416, for forwarding the transaction to the next hop or route point. The hashing module 412 generates a hashed value by either hashing a system memory address of the received request transaction or using a pseudo random number generator. The GLT 414 combines the hashed value from the module 412 and a group size value from the supplemental routing ID table 422 to come up with a value that corresponds to one of the ports in the group selected by the array control unit 418. This combination of the hashed value and the group size value also normalizes the array 416 to limit the randomization of the port being selected to the number of ports in the particular group.

In the illustrated embodiment, as noted above the memory 420 includes the supplemental routing ID table 422 and the routing ID table 424. The memory 420 may be implemented using a conventional computer memory such as a random access memory (RAM). In one embodiment, the supplemental routing ID table 422 and the routing ID table 424 are located in separate memories.

In network routing, the maximum number of endpoints that a given transaction can be routed to is generally limited by the number of bits in target IDs. For example, for a 9 bit target ID, the maximum number of routable endpoints is 512 ($2^9$) endpoints/entries. When dealing with the routing ID table 424 and the memory 420 of fixed sizes, the number of the bits in the target IDs is selected such that that all the routable endpoints can be fit and indexed into the routing ID table 424 in the memory 420. Increasing the number of the routable endpoints thus has conventionally required increasing the size of target IDs and also the size or depth of the routing ID table and memory.

In one embodiment, the number of routable endpoints is increased without increasing the number of target ID bits or the sizes/depths of a routing ID table and a memory. Using one or more bits of the supplement routing ID as the extension of the target IDs, the number of the target ID bit increases and so does the number of routable endpoints. This usage of the supplemental routing ID is made possible by the flexible programmability of the supplemental routing ID table 422, such that allows one or more bits of the supplemental routing ID to be used as the most significant bit(s) of the target IDs.

When target IDs borrow bits from supplemental routing IDs, the number of fields, i.e. the number of ports, that can be identified and grouped for each endpoint are reduced. Using the example of the above, 2 bits of the supplemental routing ID, when used as the two most significant bits of a target ID, increase the number of routable endpoints four times ($2^2$) to 2048 while reducing the number of identifiable ports from 16 ports to 4 ports for each endpoint. It is understood that while borrowing some of supplemental routing ID bits reduces a number of fields for each entry, it allows more flexibility in adapting to the changing network condition using a fixed set of hardware, e.g., the memory 420.

Figure 5:
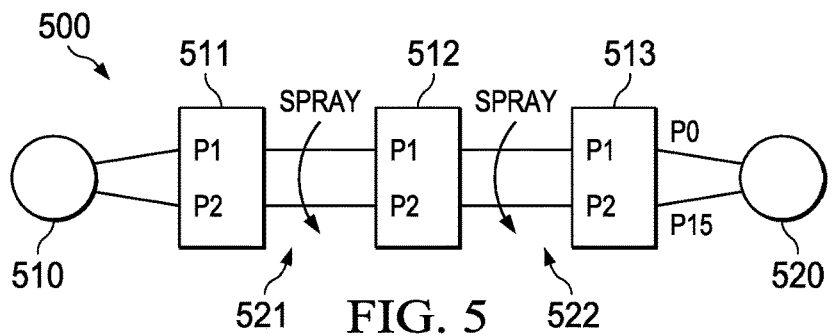
FIG. 5 illustration of an embodiment of a network in which sprayed transactions are sorted using a sorting technique introduced in the disclosure.

FIG. 5 illustrates an embodiment of a network 500 in which sprayed transactions are sorted using a sorting technique introduced in the disclosure. Similar to the network 100 in FIG. 1, the network 500 is an interconnect fabric that uses a networking protocol, such as NVLink™, that supports multi-port connection and link aggregation features. In the illustrated embodiment, the network 500 also supports a bulk collapsing feature that reduces the overhead of the transactions and the load on the network by collapsing transactions, e.g., write response transactions, from a same source port onto one another.

In FIG. 5, the network 500 is simplified to show only two endpoints, one source endpoint 510 and one target endpoint 520, that transmit and receive transactions through the network 500. While only two are shown, there may be many more endpoints in the network 500 that communicate with one another. Similar to the endpoints 110-130 in FIG. 1, the source and target endpoints 510, 520 are not limited to their labeled roles and each can include processing units such as graphics processing units (GPUs) and central processing units (CPUs), storage units such as memories, and/or networking units such as network interface cards.

In the illustrated embodiment, the endpoints 510, 520 are connected using switches 511-513. Similar to the switches 111-115 in FIG. 1, each of the switches 511-513 may be a switching device that supports multi-port connection and link aggregation such as NVSwitch™, and also support statistical multipathing to minimize hot-spotting effects from converging multiple traffic streams. Ports of the endpoints 510, 520 are connected to ports of the first 511 and third 513 switches, and ports of the switches 511-513 are connected to one another. The multi-port connections and link aggregation between the switches 511-513 allow spraying of transactions between the switches 511-513.

When request transactions are transmitted from the ports P1 and P2 of the source endpoint 510 to the target endpoint 520, the transmitted transactions are sprayed over aggregated links 521 and 522 as they travel through the switches 511-513. As such, by the time the transactions reach the third, last hop switch 513, transactions transmitted from P1 are intermingled with those transmitted from P2.

To get maximum benefit from the collapsing feature, streams of transactions from a same source endpoint port should ideally always target the same destination endpoint port. This has the effect of causing a source-based localization of transactions, which is ideal for collapsing transactions, in a manner similar to how a localization of CPU/GPU memory requests improve memory caching performance. But as indicated above, spraying over aggregated links can interfere with this localization causing transactions to be distributed over multiple destination endpoint ports and intermingled.

To establish the localization and aid the collapsing features, at the last-hop, third switch 513, each of the transactions is sorted based on its source endpoint port and destination endpoint. This allows all the transactions coming from a same source endpoint port and heading to a same destination endpoint, i.e., target endpoint 520, to be forwarded using a same link/port in the switch 513. More specifically, for each transaction arriving at the switch 513, an entry and a group select are first selected from a supplemental routing ID table using the target ID and the supplemental routing ID of the transaction, which indicate a source endpoint port and a destination endpoint of the transaction; and the selected entry and the group select are then used to select a specific port, e.g., P0 or P15, through which the transaction can be transmitted to the destination endpoint, target endpoint 520, from a list of ports in a routing ID table. The collapsing feature is placed or integrated into the selected port to reap the maximum benefit from the localization of the transactions. It is understood that transactions coming from different source endpoints can also be sorted and collapsed by assigning them port identifiers that are unique across sources.

It is understood that the aforementioned sorting technique may be used as an additional part of a routing method such as method 200 in FIG. 2. The sorting technique may be particularly useful for a network that supports the collapsing feature but only has a limited amount of resource to implement the feature because the sorting technique can maximize the use and benefit of every instance of the feature. It is also understood that the sorting technique can be implemented not only in the last hop switch but in any other switch inside a network, e.g., a core of an interconnect. While the localization and the collapsing benefit may not be maximized as in the last hop switch, the sorting technique can still be effective and even used as a part of a compression technique.

Those skilled in the art to which this application relates will appreciate that other and further additions, deletions, substitutions and modifications may be made to the described embodiments.

What is claimed is:

1. A method of routing transactions over a network, comprising:
    receiving a transaction that is headed to a particular port of a destination endpoint over the network;
    selecting a particular group of ports from available ports that constrains the transaction to a specific path that-routes the transaction to the particular port of the destination endpoint, wherein the available ports are identified as either positional bits of a vector or an array of port numbers; and
    routing the transaction to the particular port of the destination endpoint via the specific path.

2. The method of claim 1, wherein the routing includes forwarding the transaction toward the destination endpoint via one of the ports in the particular group.

3. The method of claim 1, wherein the routing is performed by a switch in the network.

4. The method of claim 1, further comprising identifying a list of the available ports that route the transaction to the destination endpoint using a target identifier of the transaction.

5. The method of claim 4, wherein the list of the available ports is identified in a routing identifier table.

6. The method of claim 5, further comprising partitioning the available ports into groups of ports that correspond to groups of aggregated links forming independent routing paths, and wherein the groups of ports include the particular group of ports that include the particular port of the destination endpoint.

7. The method of claim 6, wherein the available ports are partitioned into the groups using a group select and a group size from a supplemental routing identifier table.

8. The method of claim 7, wherein the routing identifier table and the supplemental routing identifier table are located in a switch that receives the transaction.

9. The method of claim 6, wherein the routing includes spraying the transaction over aggregated links that are associated with the ports in the particular group based on a hashed value and the group size.

10. The method of claim 1, wherein the particular group is selected using a target identifier and a supplemental routing identifier of the transaction, and wherein one or more bits of the supplemental routing identifier are used as one or more extension bits of the target identifier to increase a number of endpoints, to which the transaction is routable.

11. The method of claim 1, further comprising sorting sprayed transactions based on source ports and destinations of the sprayed transactions and transmitting some of the sprayed transactions that have a same source port and a same destination using a same link.

12. The method of claim 11, wherein the sorting and the transmitting are performed at a last-hop switch before the destination endpoint, and the some of the sprayed transactions are collapsed into one another.

13. A switching device for routing transactions over a network, comprising:
    a pipeline configured to:
        receive a transaction that is headed to a particular port of a destination endpoint over the network;
        select a particular group of ports from available ports that constrains the transaction to a specific path that routes the transaction to the particular port of the destination endpoint, wherein the available ports are identified as either positional bits of a vector or an array of port numbers; and
        route the transaction of the request to the destination endpoint via the specific path.

14. The switching device of claim 13 further comprising a memory that includes a routing identifier table that stores a list of the available ports in the switching device that route the transaction to the destination endpoint.

15. The switching device of claim 14, wherein the pipeline is further configured to identify the list of the available ports from the routing identifier table using a target identifier of the transaction.

16. The switching device of claim 14 wherein the memory further includes a supplemental routing identifier table that stores a supplemental routing identifier that partitions the available ports into groups of ports that correspond to groups of aggregated links forming independent routing paths, and wherein the groups of ports include the particular group of ports that include the particular port of the destination endpoint.

17. The switching device of claim 16, wherein one or more bits of the supplemental routing identifier are used as one or more extension bits of a target identifier of the transaction to increase a number of endpoints, to which the transaction are routable.

18. The switching device of claim 14, wherein the pipeline is further configured to partition the available ports into groups using a group select and a group size from a supplemental routing identifier table.

19. The switching device of claim 18, wherein the transaction is sprayed over one of aggregated links that are associated with the ports in the particular group based on a hashed value and the group size.

20. The switching device of claim 19, wherein the pipeline is further configured to sort sprayed transactions based on source ports and destinations of the sprayed transactions and transmit some of the sprayed transactions that have a same source port and a same destination using a same link.

21. The switching device of claim 20, wherein the switching device is a last-hop switch before the destination endpoint, and the some of the sprayed transactions are collapsed into one another.

22. The switching device of claim 13, wherein the transaction is forwarded toward the destination endpoint via one of the ports in the particular group.

23. The switching device of claim 13, wherein the network is an interconnect fabric that support multi-port connection and aggregated links.

24. The switching device of claim 13, wherein the transaction is a response of a request transmitted from the particular port of the destination endpoint.

* * * * *